C. F. CODA.
NOZZLE.
APPLICATION FILED SEPT. 6, 1913.

1,116,387.

Patented Nov. 10, 1914.

WITNESSES
Robert N. ...
Virginia C. Spratt.

INVENTOR
Christopher F. Coda
BY
Ralzemond A. Parker.
ATTORNEY

UNITED STATES PATENT OFFICE.

CHRISTOPHER F. CODA, OF DETROIT, MICHIGAN.

NOZZLE.

1,116,387.

Specification of Letters Patent.

Patented Nov. 10, 1914.

Application filed September 6, 1913. Serial No. 788,382.

*To all whom it may concern:*

Be it known that I, CHRISTOPHER F. CODA, citizen of the United States, residing at Detroit, county of Wayne, State of Michigan, have invented a certain new and useful Improvement in Nozzles, and declare the following to be a full, clear, and exact description of the same, such as will enable others skilled in the art to which it pertains to make and use the same, reference being had to the accompanying drawings, which form a part of this specification.

My invention relates to nozzles and an object of my improvements is to provide an improved nozzle for mixing and delivering gas and air. Hitherto the hose and nozzle have been connected by an elastic rubber tip on the former, this has been found liable to injury by the wear and heat incident to its use. I provide a nozzle which is efficient, cheap to make and readily adjusted and which is not liable to the deterioration incident to the apparatus previously used.

Figure 1:
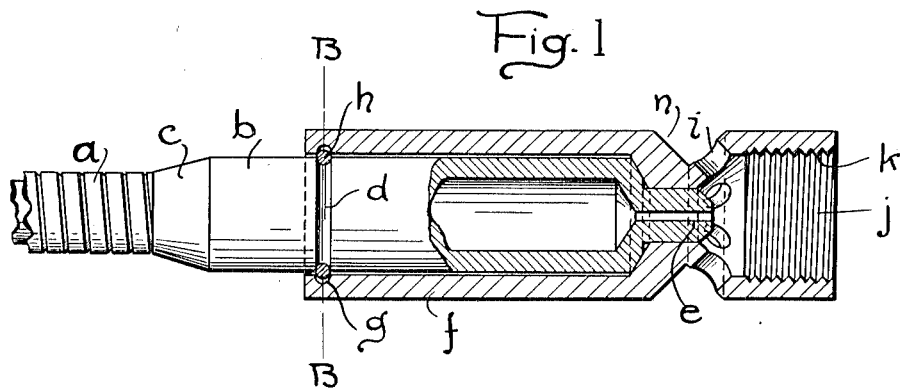
Figure 3:
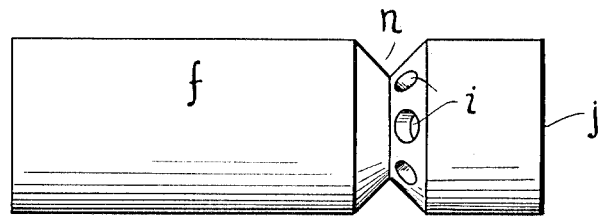
Figure 2:
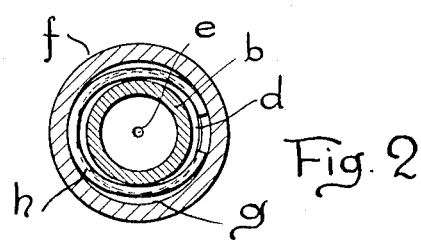

In the accompanying drawing: Figure 1, is an elevation partly in section of a device embodying my invention and so much of a hose as is necessary to illustrate its connection therewith. Fig. 2, is a section approximately on the line B—B Fig. 1. Fig. 3, is an elevation of the outer or sleeve-like removable portion of the tip.

$a$ is the end of a hose which I have represented as having a metal armor.

$b$ is a hollow cylindrical metal tip adapted to pass over the tube $a$ at one end and reduce down at the other end to form the contracted delivery nozzle $e$. The tip $b$ may be secured to the armor of the tube $a$ by solder $c$. $d$ is a groove cut into and around the exterior wall of the cylindrical tip $b$.

$f$ is a sleeve adapted to slide over the tip $b$ and fit closely thereupon. The sleeve $f$ is provided with a groove $g$ in its internal wall. A spring wire bent to approximately the form of a hoop, as shown in Fig. 2, is placed in the groove $g$ so as to remain therein. When the sleeve $f$ is caused to slide over the tip $b$, the groove $g$ comes opposite the groove $d$ and the wire $h$ engages in the groove $d$ to hold the tip $b$ and sleeve $f$ together. The sleeve $f$ is contracted at $n$ to fit against the cylindrical wall of the nozzle $e$ and against the shoulder between said nozzle and the rest of the tip $b$. The portion of the wall which slants from the outer end of the sleeve $f$ to form the contracted portion $n$ of the sleeve $f$ is pierced with holes $i$, $i$ opening at their inner ends beyond the delivery end of the nozzle $e$. The outer end of the part $f$ is provided with internal screw threads $k$ and constitutes a mixing chamber $j$.

The gas is supplied from the tube $a$ to the interior of the tip $b$ and passes in a jet through the bore of the nozzle $e$ drawing air in through the holes $i$ and mixing therewith in the chamber $j$ to form a proper combustible mixture. Screw threads $k$ are for engaging the sleeve with any device to which the inflammable mixture is to be supplied. The grooves $g$ and $d$ and the wire $h$ form a latch for securing the tip and sleeve together which permits a relative angular motion of said sleeve and tip.

What I claim is:

In a mixing nozzle, the combination of a tip $b$ having the groove $d$ around its outer surface and provided with a delivery nozzle at its end, a sleeve $f$ adapted to fit over the tip $b$ and provided with a groove $g$ in its inner surface, a resilient ring in the groove $g$, the sleeve $f$ being adapted to slip over the tip $b$ to a position at which said grooves shall come opposite each other and being provided with an air passage opening at its inner end beyond said nozzle, said ring being adapted to engage in said grooves to form a latch for securing said tip and sleeve together.

In testimony whereof, I sign this specification in the presence of two witnesses.

CHRISTOPHER F. CODA.

Witnesses:
VIRGINIA C. SPRATT,
ELLIOTT J. STODDARD.